(12) United States Patent
Dai et al.

(10) Patent No.: US 8,578,370 B2
(45) Date of Patent: *Nov. 5, 2013

(54) MANAGING MEMORY IN MULTIPLE VIRTUAL MACHINES

(75) Inventors: Xiao Jun Dai, Beijing (CN); Zhi Gan, Beijing (CN); Rui Bo Han, Beijing (CN); Xian Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/462,072

(22) Filed: May 2, 2012

(65) Prior Publication Data

US 2012/0216185 A1 Aug. 23, 2012

Related U.S. Application Data

(63) Continuation of application No. 13/330,769, filed on Dec. 20, 2011.

(30) Foreign Application Priority Data

Dec. 23, 2010 (CN) .......................... 2010 1 0612360

(51) Int. Cl.
*G06F 9/46* (2006.01)
*G06F 9/44* (2006.01)
*G06F 9/445* (2006.01)

(52) U.S. Cl.
USPC ........................... 717/174; 717/166; 718/104

(58) Field of Classification Search
None
See application file for complete search history.

(56) References Cited

U.S. PATENT DOCUMENTS

| | | | |
|---|---|---|---|
| 6,075,938 A | 6/2000 | Bugnion et al. | |
| 6,323,852 B1 * | 11/2001 | Blower et al. | 715/804 |
| 6,381,682 B2 | 4/2002 | Noel et al. | |
| 6,694,346 B1 * | 2/2004 | Aman et al. | 718/104 |
| 6,738,977 B1 * | 5/2004 | Berry et al. | 719/332 |
| 7,620,766 B1 | 11/2009 | Waldspurger | |
| 2003/0097360 A1 * | 5/2003 | McGuire et al. | 707/8 |
| 2004/0263513 A1 * | 12/2004 | Smith et al. | 345/440 |
| 2006/0070051 A1 * | 3/2006 | Kuck et al. | 717/162 |
| 2007/0074208 A1 * | 3/2007 | Ling et al. | 718/1 |
| 2007/0169121 A1 * | 7/2007 | Hunt et al. | 718/1 |
| 2008/0098389 A1 * | 4/2008 | Akiyoshi et al. | 717/175 |
| 2008/0147956 A1 * | 6/2008 | Rawson | 711/6 |
| 2008/0244057 A1 * | 10/2008 | Kojima | 709/223 |
| 2009/0006801 A1 * | 1/2009 | Shultz et al. | 711/170 |
| 2009/0119664 A1 | 5/2009 | Pike et al. | |
| 2011/0055827 A1 * | 3/2011 | Lin et al. | 718/1 |
| 2012/0084517 A1 * | 4/2012 | Post et al. | 711/153 |

OTHER PUBLICATIONS

Marty et al., "Virtual Hierarchies to Support Server Consolidation," ISCA '07, Jun. 9-13, 2007, Copyright 2007 ACM.*

(Continued)

*Primary Examiner* — Insun Kang
(74) *Attorney, Agent, or Firm* — Thomas E. Lees, LLC

(57) ABSTRACT

Virtual machines are managed by obtaining software hierarchy information of a current virtual machine to be installed. Then logical memory assigned to the current virtual machine is divided into a private part and a shared part based at least in part upon existing software hierarchy information of at least one virtual machine already installed and the software hierarchy information of the current virtual machine. Then, the shared part of the logical memory is mapped to shared segments of a physical memory, wherein the shared segments are used by at least one installed virtual machine.

8 Claims, 4 Drawing Sheets

(56) References Cited

OTHER PUBLICATIONS

Michelle Bailey, "The Value of Memory-Dense Servers: IBM's System x MAX5 for Its eX5 Server Family", White Paper, IDC Analyze the Future, Framingham, MA, Mar. 2010.

Parallels, "Parallels Virtuozzo Containers", White Paper, "More Efficient Virtualization Management: Templates", Version 2.0, www.parallels.com, Nov. 20, 2008 (date located through http://web.archive.org/web/20081120231332/http://www.parallels.com/r/pdf/wp/pvc/Parallels_Virtuozzo_Containers_WP_templates.pdf).

Timothy Wood, Gabriel Tarasuk-Levin, Prashant Shenoy, Peter Desnoyers, Emmanuel Cecchet, Mark D. Corner, Department of Computer Science, Univ. of Massachusetts Amherst and Department of Computer & Information Science, Northeastern University, "Memory Buddies: Exploiting Page Sharing for Smart Colocation in Virtualized Data Centers", VEE '09, Mar. 11-13, 2009, Washington, DC.

David Wentzlaff, Charles Gruenwald III, Nathan Beckmann, Kevin Modzelewski, Adam Belay, Lamia Youseff, Jason Miller and Anant Agarwal, Computer Science and Artificial Intelligence Laboratory, Massachusetts Institute of Technology, Cambridge, MA, "An Operating System for Multicore and Clouds: Mechanisms and Implementation", SoCC '10, Jun. 10-11, 2010, Indianapolis, Indiana.

HP, "Introducing HP-UX 11i Virtual Partitions, A White Paper from HP", Sep. 2007.

Mitra et al., "Hierarchical Virtual Partitioning—Algorithms for Virtual Private Networking," Bell Labs Technical Journal, Spring 1997.

Notice of Allowance dated Jun. 28, 2013 for U.S. Appl. No. 13/330,769, Xiao Jun Dai et al., "Managing Memory in Multiple Virtual Machines", filed Dec. 20, 2011.

\* cited by examiner

MANAGING MEMORY IN MULTIPLE VIRTUAL MACHINES

CROSS-REFERENCE TO RELATED APPLICATIONS

This application is a continuation of U.S. patent application Ser. No. 13/330,769, filed Dec. 20, 2011, entitled "MANAGING VIRTUAL MACHINES", now pending, which claims priority to Chinese Patent Application No. 201010612360.9, filed Dec. 23, 2010, the disclosures of which are incorporated herein by reference.

BACKGROUND

Various aspects of the present invention relate generally to virtual machines, and more particularly, to managing virtual machines.

In recent years, virtualization technology has been widely used in many situations in order to improve the efficiency of information technology (IT) resources and applications. Virtualization technology can instantly assign resources, applications, and servers to a corresponding location according to the needs of the location to integrate various resources and improve computer usability, thereby saving 50%-70% of IT cost.

The typical realization of virtualization is to simulate, in a physical machine, at least one virtual computer, i.e. Virtual Machine, which is a completed computer system having entire functions of physical systems running in an isolated environment and simulated by software. Such virtual machines can host their own guest operating system and applications like physical computers and can have all components like physical computers, including simulations of a motherboard, hard disk, network card controller, etc. Although multiple virtual machines may share the physical resources of one computer, they are isolated from one another like different physical computers. For example, if there are four virtual machines in one physical server but one of them crashes, the other three can be still available. Because of such isolation, the usability and security of applications running in virtual environment is far better than that in traditional non-virtualized systems.

To keep isolated from one another, virtual machines retain independency of hardware resource distribution and share as few common physical resources as possible. Specifically, in memory management, a hypervisor between the physical platform and virtual machines assigns a separate segment of memory for each virtual machine, and each virtual machine only accesses its own memory.

BRIEF SUMMARY

According to aspects of the present invention, virtual machines are managed by obtaining software hierarchy information of a current virtual machine to be installed. The logical memory assigned to the current virtual machine is divided into a private part and a shared part based at least in part upon existing software hierarchy information of at least one virtual machine already installed and the software hierarchy information of the current virtual machine. The shared part of the logical memory is mapped to shared segments of a physical memory, wherein the shared segments are used by at least one installed virtual machine.

DETAILED DESCRIPTION

The following is the description of the embodiments in connection with the drawings. It is understood that the following described exemplary embodiments are intended to be illustrative, rather than restrictive, of the present invention.

Figure 1:
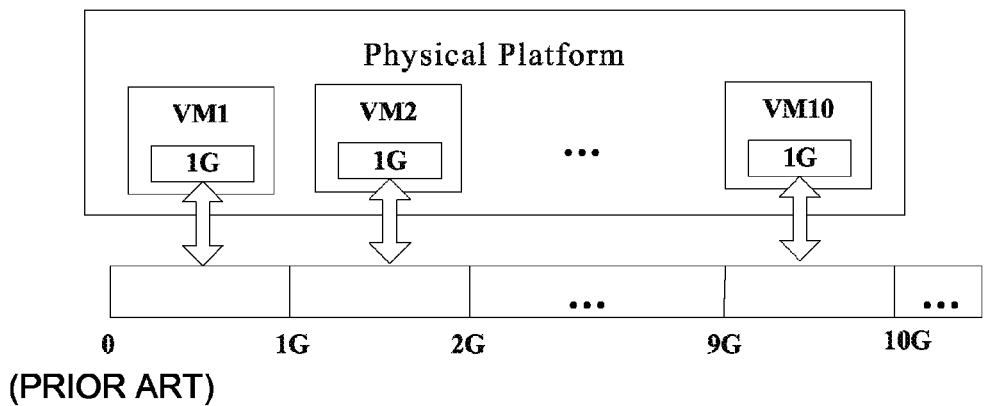
FIG. 1 illustrates the memory management for a plurality of virtual machines in the existing technique.

Referring now to the drawings, FIG. 1 illustrates the memory management for a plurality of virtual machines. As shown in FIG. 1, ten virtual machines (VMs), labeled as VM1-VM10 respectively, are installed on one physical platform. The hypervisor of the virtual machines assigns a memory segment for each virtual machine according to the hardware capacity of the physical platform and the running requirement of each virtual machine. Further, the hypervisor maintains the mapping relation between virtual machine memory and physical memory. For example, in the exemplary implementation illustrated, assume that the total memory capacity of the physical platform is 15 GB (gigabytes). Further, assume that the hypervisor assigns 1 GB of memory for each virtual machine and isolates the memory of each virtual machine from one another, for example, assigning 0-1 GB of the physical memory to VM1, 1-2 GB to VM2, etc. Therefore, each virtual machine can only see and access that 1 GB of memory assigned to it. Specifically, when VM2 accesses the memory, the memory management unit of VM2 first converts the requested logical address to the corresponding address in its visible 0-1 GB physical memory, which is called the guest physical address. Then the hypervisor obtains the guest physical address, maps the guest physical address to the real physical address of the physical memory by referring to the mapping relation between virtual machine memory and physical memory. Then, the hypervisor returns the real physical address to the virtual machine. For example, if the requested guest physical address of VM2 is 0.5 GB, then the returned real physical address from the hypervisor is 1.5 GB. Thereby, each virtual machine holds the private memory segment separately and accesses the memory isolated from one another.

However, the above isolating method has shortage in resource usage. Suppose one virtual machine needs 2 GB of memory to run an operating system and basic upper level applications smoothly. Under this arrangement, then at least 200 GB of physical memory is needed if 100 such virtual machines are installed on one physical platform, which is a high requirement on the physical platform. It is a possibility that most of these 100 virtual machines are based on the same operating system, and thus multiple copies of the operating system exist on the physical platform, which causes resource waste. Nevertheless, for the whole system, keeping independence and isolation among virtual machines is a basic requirement of virtualization.

However, aspects of the present invention improve the resource usage of the physical platform hosting multiple virtual machines. With the method and the apparatus of this invention, virtual machines on one physical platform can share a part of memory at various levels. Therefore, the memory resources can be used more efficiently while virtual machines keep independent and isolated from one another. As will be described in greater detail herein, in consideration of the operating system and applications, i.e. the installed software information at various levels of Virtual Machines (VM) installed on one physical platform, the VMs with similar software at the same level may share the memory partially, thereby using the memory resources efficiently while keeping independence and isolation from one another.

Figure 2:
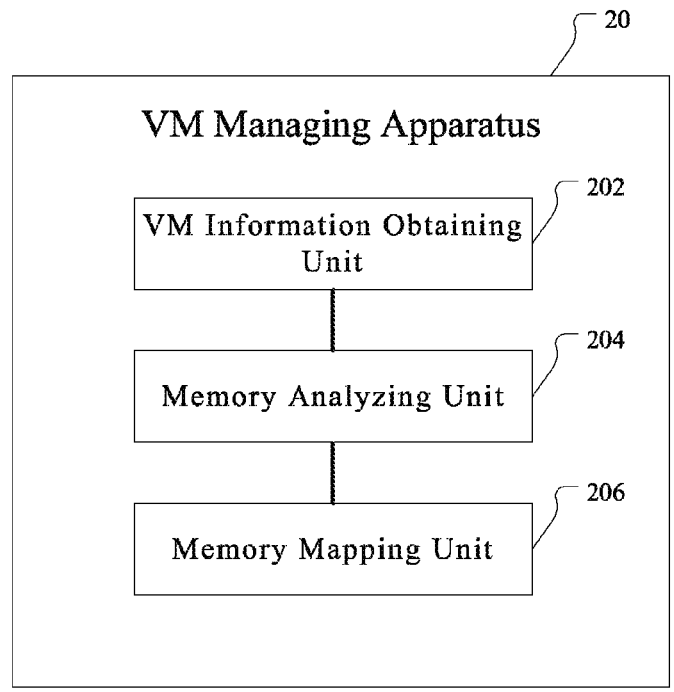
FIG. 2 is a block diagram of the apparatus for managing virtual machines according to various aspects of the invention.

FIG. 2 is a block diagram of an apparatus for managing VMs according to one embodiment of the invention, wherein the apparatus resides between a physical platform and VMs. The apparatus can run for instance, on the system of FIG. 1. The apparatus is configured to manage a plurality of VMs installed on the physical platform. As shown in FIG. 2, the VM managing apparatus 20 comprises a VM information obtaining unit 202, which is configured to obtain the software hierarchy information of the current VM; a memory analyzing unit 204, which is configured to divide the logical memory assigned to the current VM into a private part and a shared part by referring to the software hierarchy information of at least one installed VM and that of the current VM; and a memory mapping unit 206, which is configured to map the shared part of the logical memory to the shared segments of the physical memory, wherein the shared segments are used by at least one installed VM.

Specifically, the VM information obtaining unit 202 can obtain the software information of a VM during installation of the VM. Typically, the installation of a VM comprises first installing the bottom software, i.e. the operating system that the VM runs, and then installing various applications above the operating system. The installation of applications is also performed in several levels. For example, first a user may install Java Virtual Machine (JVM) on a certain operating system, then install WAS (WebSphere Application Server) in the JVM environment, and then install upper functions like WPS (WebSphere Process Server) based on WAS. Generally, the installation file of each software application introduces the information of the application in the file header, such as the name, the version, the distributor, the distribution time, etc. Therefore, during the installation of respective applications in various levels, the VM information obtaining unit 202 can obtain the information of the installed software application by reading the header information of the installation file.

For a currently installing VM, the VM information obtaining unit 202 obtains the software information, for example, by reading the header information of the installation file as described above and gets the software hierarchy information of the current VM in connection with the level that the software resides. The VM information obtaining unit 202 further sends the obtained software hierarchy information of the current VM to the memory analyzing unit 204.

For the installed VMs, the VM information obtaining unit 202 has already obtained their software information during their installation and thus gets the software hierarchy information of each installed VM. Further, the VM information obtaining unit 202 can combine and compare the software hierarchy information of multiple installed VMs and can maintain the software hierarchy information in various manners.

Figure 3:
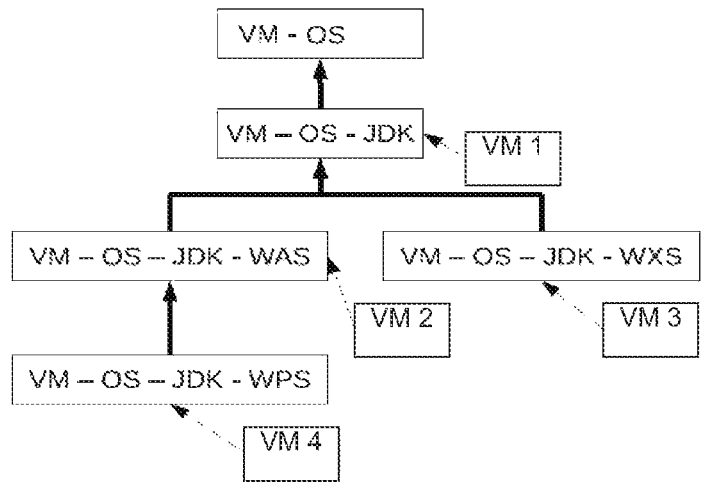
FIG. 3 illustrates the exemplary software hierarchy information of multiple virtual machines according to various aspects of the invention.

In one embodiment, the software hierarchy information of the installed VMs is structured in a tree map, as shown in FIG. 3. Specifically, FIG. 3 illustrates the exemplary software hierarchy information of multiple VMs according to one embodiment of the invention. In FIG. 3, the software hierarchy information of four installed VMs is illustrated, wherein the inheritance between the nodes of the tree denotes the relation between the software hierarchy information of each VM. According to the features of a tree map, a child node of a parent node has all of the software hierarchy information of the parent node, and accordingly, two child nodes inherited from the same parent node share the software hierarchy information of the parent node. More specifically, VM1 only has Java Development Kit (JDK) installed upon the operating system, VM2 has WAS installed in JDK based on VM1, and VM3 has WXS installed based on VM1. Further, compared with VM2, VM4 further has WPS installed based on VM2. VM2 and VM3 both have the software hierarchy information of VM1 at the parent node. By maintaining such tree map, the VM information obtaining unit 202 can clearly represent the relation among the software hierarchy information of various VMs.

Figure 4:
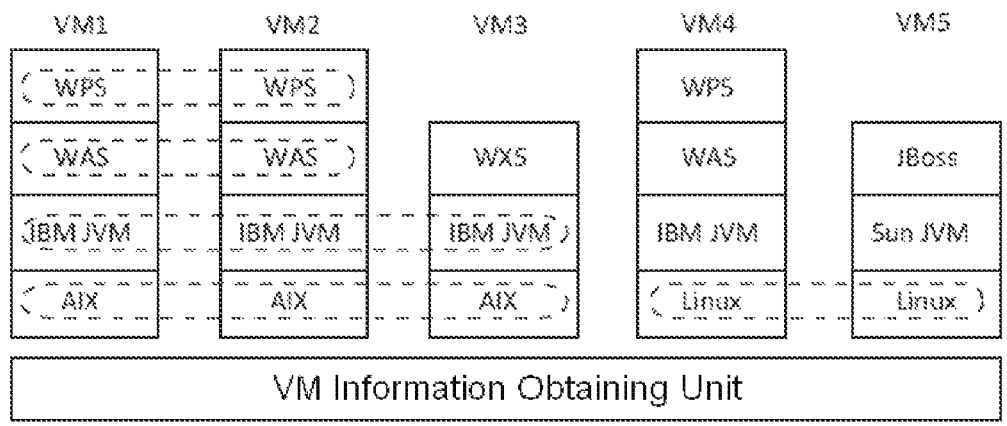
FIG. 4 illustrates the exemplary software hierarchy information of multiple virtual machines according to various aspects of the invention.

In another embodiment, the software hierarchy information of the installed VMs is structured using histograms as shown in FIG. 4. Specifically, FIG. 4 illustrates the exemplary software hierarchy information of multiple VMs according to another embodiment of the invention. In FIG. 4, for each VM, the information of the software installed at each level is illustrated in a histogram from bottom to top. For example, VM1 has IBM Java Virtual Machine installed on AIX operating system, and WAS and WPS in turn installed based on JVM; VM2 has the same software hierarchy information with that of VM1; VM3 has WXS installed based on Java Virtual Machine; and VM4 and VM5 have Java Virtual Machines in different versions, one from IBM and the other from Sun, installed separately based on Linux operating system. By maintaining such histograms as in FIG. 4, the VM information obtaining unit 202 can clearly represent the detailed software hierarchy information of each VM.

It is understood that, the software hierarchy information of the installed VMs can be maintained in other ways, for example, structured in lists, texts, or other graphs. Those skilled in the art can select or modify the way of maintaining the software hierarchy information according to needs, and such selection or modification should be included in the concept of this invention.

Then, the memory analyzing unit 204 determines the memory sharing manner of the current VM, by referring to the software hierarchy information of the current VM and the software hierarchy information of the installed VMs sent from the VM information obtaining unit 202. Specifically, during the installation of a VM, a memory segment is assigned to the VM by user settings or system default settings. The memory segment is exclusive from the viewpoint of the VM but is only the logically usable memory of the VM from the viewpoint of the VM managing apparatus and therefore is referred to herein as logical memory. To determine the physical sharing manner of the assigned logical memory of each VM, the memory analyzing unit 204 compares the software hierarchy information of the current VM with that of the installed VMs, in order to find the installed VM whose software hierarchy information is the most similar with that of the current VM. By determining the common software hierarchy information of the most similar installed VM and the current VM, the memory analyzing unit 204 divides the logical memory assigned to the current VM into a private part and a shared part, wherein the shared part is related with the above common software hierarchy information.

Specifically, in one example, the software hierarchy information of the installed VMs is shown as FIG. 4, wherein the software hierarchy information of five installed VMs is illustrated. When a new VM, VM6 (i.e., the current virtual machine), is being installed, the VM information obtaining unit 202 obtains the installation information of the sixth VM, for example, the installed operating system is Linux, based on which IBM Java Virtual Machine is installed, based on which WXS is installed. By comparing the software information of the current sixth VM with that of the installed VMs shown in FIG. 4, the memory analyzing unit 204 can judge that the installed VM4 has the most similar software hierarchy structure with that of the current VM, and that VM4 and the current VM have the same operating system and Java Virtual Machine.

Actually, in the memory necessary for an operating system to keep the basic environment running, a part of such memory is used to maintain the fixed items like various library functions needed by the operating system. The operating system usually only accesses this part of the memory and never modifies or writes into this part. Therefore, this part of the memory can be shared among multiple VMs without influencing the isolation among VMs. For software applications, there also exists a similar fixed memory segment, which can be shared among multiple VMs. Therefore, after the memory analyzing unit 204 confirms that VM4 has the same operating system and Java Virtual Machine as the current VM, the current VM and VM4 may be caused to share a part of the memory based on the fixed memory segments of the Linux operating system and Java Virtual Machine.

Specifically, the memory analyzing unit 204 can divide the logical memory assigned to the current VM into a private part and a shared part, wherein the private part is special for the current VM and the shared part is the memory part probably commonly used with other VMs. Generally, the size of the shared part relates with the size of the common software between the current VM and the installed VMs, which relates to the size of the fixed memory segment that can be shared in the occupied memory of the common software. In the above example, suppose the occupied memory of Linux operating system has a 0.3 GB fixed memory segment and the occupied memory of Java Virtual Machine has a 0.2 GB fixed memory segment, then the current VM and VM4 can share 0.5 GB of memory. Accordingly, if the memory assigned to the current VM is 2 GB, then the private memory part of the current VM is 1.5 GB.

As described above, the memory analyzing unit 204 determines the memory sharing manner logically. Then, the memory mapping unit 206 further realizes the above sharing manner physically.

Specifically, there is a memory managing unit within each VM, configured to maintain a mapping table between the logical address and the physical address of the requested memory during the running of the VM. The physical address is the address in the memory segment that is assigned to the VM and thus visible to the VM, i.e., the guest physical address. However, the guest physical address is not the real physical address in the physical memory of the hardware platform, but needs further converting by the memory mapping unit 206. Specifically, the memory mapping unit 206 maintains the mapping relation between the guest physical address of each VM and the real physical address in the physical memory, which can be stored in a page table. After obtaining the guest physical address requested by a VM, the memory mapping unit 206 determines the corresponding real physical address by referring to the maintained page table, so as to allow the VM to access the memory labeled by the real physical address. To realize memory sharing, the memory mapping unit 206 needs to maintain a special mapping table in order to map the guest physical addresses of multiple VMs to the same real physical address, thereby realizing physical memory sharing.

Figure 5:
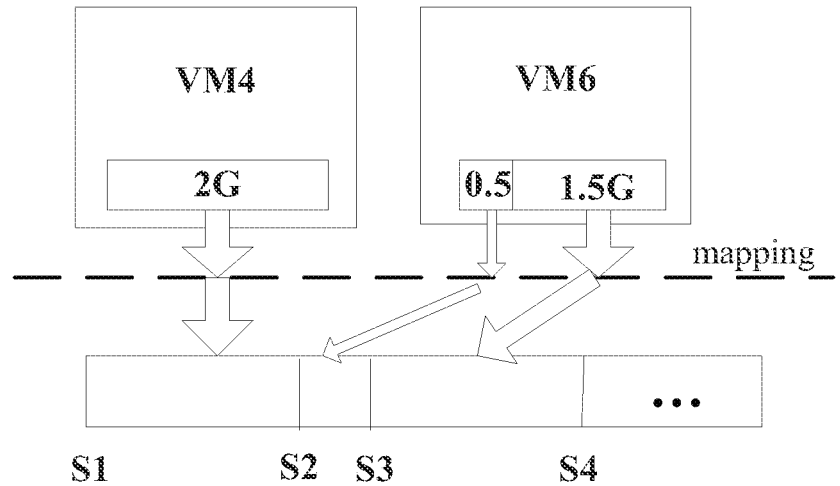
FIG. 5 illustrates the memory mapping manner according to various aspects of the invention.

FIG. 5 illustrates the memory mapping manner according to one embodiment of the invention. In FIG. 5, VM4 and the current VM6 are both assigned 2 GB memory, and each of them can access its assigned memory through the guest physical address. Further, VM4 and the current VM6 have the above-described software hierarchy information, and therefore they can share 0.5 GB logical memory based on the same Linux operating system and Java Virtual Machine in the same version. For VM4, memory the mapping unit 206 maps the guest physical address of logical memory 0-2 GB to real physical memory segments S1-S3 as usual, wherein the size of S1-S3 is 2 GB, and the fixed memory segment occupied by the operating system and Java Virtual Machine in S1-S3 is S2-S3 with size of 0.5 GB. The assigned 2 GB of memory for the current VM6 has been logically divided into the private part and the shared part, wherein the shared part is 0.5 GB, corresponding to the fixed memory segment occupied by the operating system and Java Virtual Machine. Thus, the memory mapping unit 206 maps the guest physical address of the shared part 0.5 GB of VM6 to the shared memory segments S2-S3 of the physical memory, which are already used by VM4, and maps the guest physical address of the other 1.5 GB logical memory to memory segments S3-S4, which are private for VM6 and their size is 1.5 GB. Thereby, VM4 and VM6 share 0.5 GB memory through the mapping by memory mapping unit. In this case, the logically usable memory of each of these two VMs is still 2 GB separately, but the total size of the real occupied physical memory is only 3.5 GB.

To record the occupation status of memory segments, in one embodiment, the memory mapping unit 206 can add a status bit into the existing mapping table to label the sharing status of the corresponding memory segment. For instance, in one example, S is used to label the shared memory segment and P is used to label the private memory segment. In the above example, when the memory mapping unit 206 maps the shared part 0.5 GB of VM6 to memory segments S2-S3, it can change the status bit of memory segments S2-S3 from P to S. To ensure the security of sharing, when VMs access physical memory, the VMs are only allowed to read from those memory segments with status S but not allowed to modify or write into those segments. Therefore, even in case VM4 crashes, VM4 does not influence the data in memory segments S2-S3, and thus VM6 can still run normally, which keeps the necessary independency and isolation.

In the above embodiments, with the memory analyzing unit 204 and the memory mapping unit 206, VMs can share a part of memory at different levels. For example, the current VM and VM4 share 0.3 GB of memory at operating system level and share 0.2 GB of memory at Java Virtual Machine level, which further improves the efficiency of memory usage. Moreover, the sharing manner is more flexible for applying in various situations.

However, the sharing relation among VMs is not always the same, but varies along with the change of the software hierarchy information of VMs. Still referring to the above described example, when VM1-5 shown in FIG. 4 have been installed on the physical platform, for the currently being-installed VM6, the sharing manner shown in FIG. 5 can be adopted. Then, after the installation of VM6 is completed, some user may possibly uninstall VM4 and release the memory occupied by VM4. In this case, the VM information obtaining unit 202 will update the maintained software hierarchy information and change it to the software hierarchy information of the installed VM1-3 and VM5-6. In one embodiment, to release the memory of VM4 without influencing other VMs, the memory mapping unit 206 entirely releases the private memory part S1-S2 occupied by VM4, but neither releases memory segments S2-S3 shared by VM4 and VM6 nor changes status S of memory segments S2-S3. Then, if a new VM7 is further installed, the memory analyzing unit 204 similarly determines the memory sharing manner referring to the software hierarchy information of the installed VM1-3 and VM5-6.

Figure 6A:
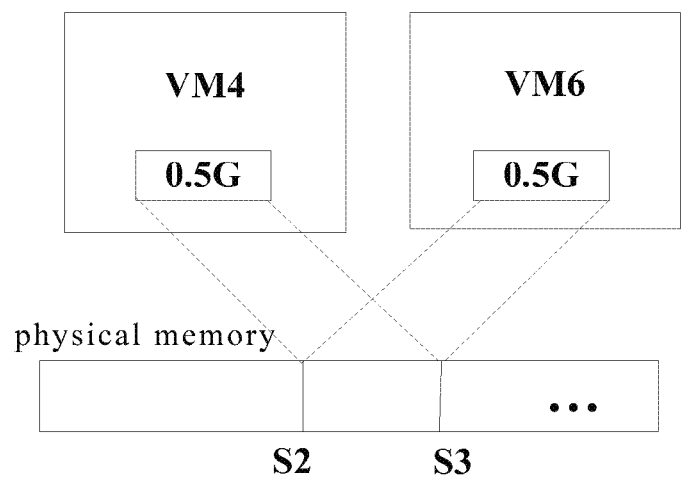
FIG. 6 illustrates the change of the memory mapping according to various aspects of the invention.
Figure 6B:
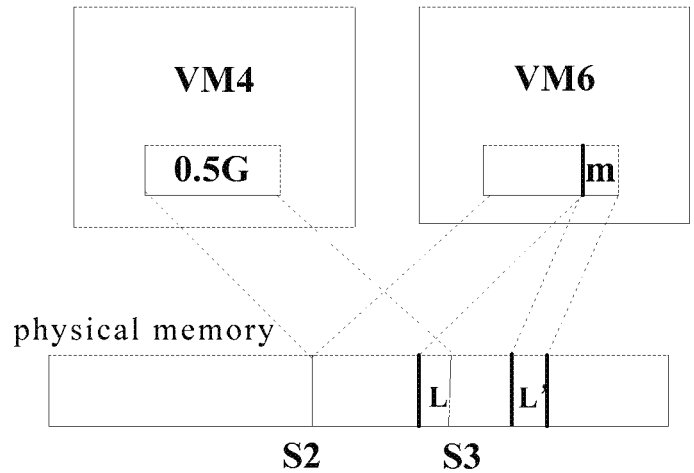

If the configuration status of a VM changes, the sharing relation and the sharing manner among the VMs may also change accordingly. FIG. 6 illustrates the change of the memory mapping manner according to one embodiment of the invention, wherein FIG. 6A illustrates the original mapping relation and FIG. 6B illustrates the changed mapping relation. As shown in FIG. 6A, accordant with the above example, VM4 and VM6 both have 0.5 GB of logical memory mapped to the same physical memory segments S2-S3. Such shared memory segments S2-S3 may maintain the data related with the configuration of the operating system.

In some situation, as shown in FIG. 6B, VM6 needs to change the configuration of its operating system and therefore needs to modify the sub-segment m of the shared logical memory. After receiving the request for modifying memory segment m from VM6, by querying the former mapping table, the memory mapping unit 206 can find that the logical memory segment m is mapped to sub-segment L in the shared segments S2-S3 of the physical memory, whose status is S and not allowed to be modified. Then, the memory mapping unit 206 can create a new memory segment L' from the free physical memory, copy the data in segment L to segment L' and set the status bit of segment L' to P.

Furthermore, memory mapping unit 206 modifies the mapping table and makes logical memory m of VM6 mapped to physical memory segment L'. Thereby, VM6 realizes the modification on logical memory segment m by writing into the physical memory segment L' with status P. Further, the other part in memory segments S2~S3 is still shared by VM4 and VM6, while sub-segment L may be changed to be private for VM4, if so desired. Through the above process, a VM can modify a part of the shared memory without influencing other VMs.

As described above, the VM managing apparatus of this invention determines the sharing manner among VMs according to the software hierarchy information of VMs and makes different VMs share a part of memory at various levels. It can be seen that the more the shared memory among VMs is, the more the saved memory on the physical platform is. At the same time, because the shared memory is selected specially and cannot be modified by a single VM, VMs can still keep independent and isolated from one another without influencing the security.

Figure 7:
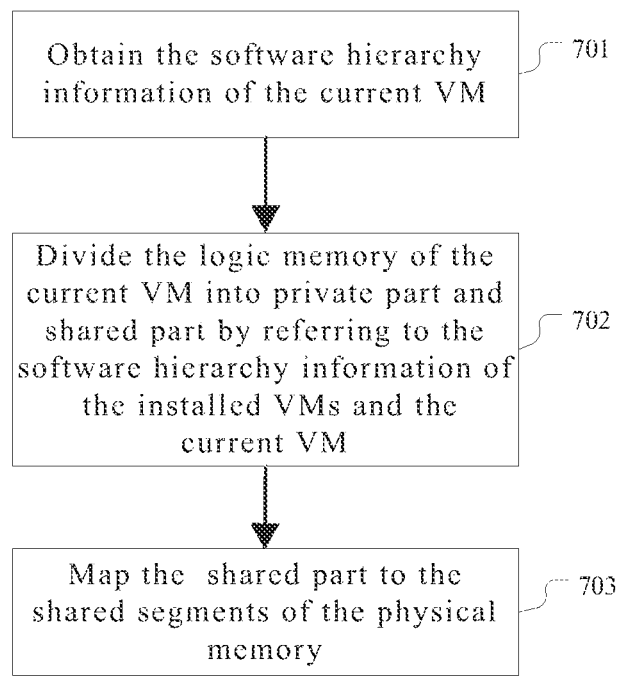
FIG. 7 is a flowchart of the method for managing virtual machines according to various aspects of the invention.

Based on the same concept, this invention also provides the method for managing VMs. FIG. 7 is a flowchart of the method for managing VMs according to one embodiment of the invention, wherein the method is used to manage a plurality of VMs installed on the same physical platform. As shown in FIG. 7, the method for managing VMs according to one embodiment comprises: at 701, wherein the software hierarchy information of the current VM is obtained; at 702, wherein the logical memory assigned to the current VM is divided into a private part and a shared part according to the software hierarchy information of at least one installed VM and that of the current VM; and at 703, wherein the shared part is mapped to the shared segments of the physical memory, which is already used by at least one installed VM.

In one embodiment, at 701 the method may comprise obtaining the software information of the current VM by reading the header information of the installation file during the installation of the current VM. Based on such information and in connection with the level that the software resides, the software hierarchy information of the current VM can be obtained.

Similarly, for each installed VM, its software hierarchy information can be obtained when it is installed. By combination and comparison, the software hierarchy information of multiple installed VMs can be maintained in various manners. In one embodiment, the software hierarchy information of the installed VMs is structured in a tree map. In another embodiment, the software hierarchy information of the installed VMs is structured in histograms. It is understood that the software hierarchy information of the VMs can also be illustrated in other manners, which is as the description referring to the apparatus for managing VMs and needless to describe again here.

Then at 702, the memory of the current VM is divided by referring to the software hierarchy information of the installed VMs and that of the current VM obtained at 701. Specifically, at 702, by comparing the software hierarchy information of the installed VMs with that of the current VM, the method determines the installed VM whose software hierarchy information is the most similar with that of the current VM. Based on the common software hierarchy information of the current VM and that of the most similar installed VM, the logical memory assigned to the current VM is divided into a private part and a shared part, wherein the private part is special for the current VM and the shared part is the memory part probably commonly used with other VMs. Specifically, the size of the shared part relates with the size of the common software between the current VM and the installed VM, and the size of the fixed memory segment that can be shared in the memory occupied by the common software.

To realize memory sharing physically, at 703, by maintaining a special mapping table, the address of the shared part can be mapped to the shared segments of the physical memory, wherein the shared segments are already used by other VMs. The physical memory can be shared by mapping the logical memory of multiple VMs to the same physical memory address.

To record the occupation status of memory segments, in one embodiment, at 703, the method can also comprise incorporating a status bit in the mapping table, in order to label the sharing status of each memory segment. For memory segments in shared status, VMs can only read from but not modify or write into them.

However, the sharing relation among VMs is not fixed. In the case that a VM is uninstalled, the VM managing method also comprises releasing the memory (not shown). Here, the private physical memory occupied by the uninstalled VM is entirely released. The shared memory segment occupied by the VM is not released until the last VM that uses the memory segment is uninstalled. When the configuration status of a VM changes, the sharing relation and the sharing manner among VMs also change accordingly. Specifically, in the case that a VM tries to modify the shared part in the logical memory, the VM managing method also comprises a modification (not shown), which comprises creating new memory segments from the free physical memory; copying the data in the shared segments of the physical memory, which are originally mapped from the shared part, to the new memory segments; and modifying the mapping table to map the shared part to the new memory segments. Thereby, the shared part can be modified safely without influencing other VMs. The detailed embodiments for the modification are as described in greater detail herein referring to the above VM managing apparatus.

From the above description in connection with the embodiments, it can be seen that with the VM managing apparatus and method of this invention, VMs installed on the same physical platform can share a part of memory without influencing the isolation and security of VMs.

Those skilled in the art can understand that the above-mentioned method and apparatus for managing VMs can be practiced by executable instructions and/or controlling codes in the processors e.g. codes in media like disc, CD or DVD-ROM; memories like ROM or EPROM; and carriers like optical or electronic signal carrier. The apparatus and its units can be realized using hardware like VLSI or Gates and Arrays, like semiconductors e.g. Logic Chip, transistors, etc., or like programmable hardware equipment, e.g. FPGA, programmable logic devices, etc.; or using software executed by different kinds of processors; or using the integration of the hardware and software. The application for implementing the invention can be programmed using object-oriented languages like Java, Smalltalk, C++, etc., and the traditional procedural languages like C language or other similar languages. The source code can be executed locally or remotely.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

As noted above, computer program code for carrying out operations for aspects of the present invention may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

The above-described exemplary embodiments are intended to be illustrative in all respects of the method and apparatus for managing VMs, rather than restrictive, of the present invention. Those skilled in the art should recognize that the present invention is capable of many variations and modifications within the scope and spirit of the present invention. The scope of the present invention is defined only by the appended claims.

What is claimed is:

1. A method for managing virtual machines, the method comprising:
    obtaining software hierarchy information of a current virtual machine to be installed;
    dividing, using a processor, logical memory assigned to the current virtual machine into a private part and a shared part based at least in part upon: existing software hierarchy information of installed virtual machines and the software hierarchy information of the current virtual machine; wherein the dividing the logical memory comprises:
        comparing the software hierarchy information of the current virtual machine with the existing software hierarchy information;
        determining which installed virtual machine among the installed virtual machines has software hierarchy information that is most similar with the software hierarchy information of the current virtual machine;
        determining the common software hierarchy information between the software hierarchy information of the current virtual machine and the most similar software hierarchy information of the installed virtual machine;
        based on the common software hierarchy information, dividing the logical memory assigned to the current virtual machine into the private part and the shared part;
    relating the size of the shared part of the logical memory of the current virtual machine with the size of common software between the current virtual machine and the installed virtual machine having the most similar software hierarchy information, and the size of fixed memory segment that can be shared in the memory occupied by the common software;
    mapping, using the processor, the shared part of the logical memory of the current virtual machine to shared segments of a physical memory, wherein the shared segments are used by at least one of the installed virtual machines.

2. The method of claim 1, wherein obtaining the software hierarchy information of the current virtual machine further comprises obtaining the software hierarchy information of the current virtual machine by reading header information of an installation file during installation of the current virtual machine.

3. The method of claim 1, wherein the existing software hierarchy information of the installed virtual machines is maintained in the form of a tree map.

4. The method of claim 1, wherein the existing software hierarchy information of the installed virtual machines is maintained in the form of a histogram.

5. The method of claim 1, wherein mapping the shared part to the shared segments comprises, maintaining a mapping table to record the mapping relation between the shared part of the logical memory of the current virtual machine and the shared segments of the physical memory.

6. The method of claim 5, wherein the mapping table comprises a status bit to label a sharing status of each memory segment of the shared segments.

7. The method of claim 1 further comprising releasing, in response to a request to uninstall an installed virtual machine, the segments of the physical memory corresponding to the private part of the uninstalled virtual machine.

8. The method of claim 1 further comprising:
    creating, in response to a request from any virtual machine to modify the shared part of the logical memory of the current virtual machine, new memory segments in the physical memory,
    copying data from the shared segments corresponding to the shared part of the logical memory of the current virtual machine to the new memory segments; and
    mapping the shared part to the new memory segments.

* * * * *